United States Patent

[11] 3,626,500

| [72] | Inventor | Carl Dummann<br>3959 Spenard Road, Anchorage, Alaska 99503 |
|---|---|---|
| [21] | Appl. No. | 55,708 |
| [22] | Filed | July 17, 1970 |
| [45] | Patented | Dec. 7, 1971 |

[54] AERATION SYSTEM AND METHOD OF FABRICATION
8 Claims, 6 Drawing Figs.

[52] U.S. Cl. ............................................. 261/121 R, 261/122
[51] Int. Cl. ............................................. B01f 3/04
[50] Field of Search ............................................. 261/121 R, 122

[56] References Cited
UNITED STATES PATENTS

| 1,285,494 | 11/1918 | Wallace et al. ............... | 261/122 |
| 2,294,973 | 9/1942 | Ford............................... | 261/122 |
| 2,354,609 | 7/1944 | Phipps........................... | 261/122 |
| 2,417,519 | 3/1947 | Persson et al................. | 261/121 |
| 2,555,201 | 5/1951 | Nordell ......................... | 261/121 |
| 2,639,131 | 5/1953 | Coombs ........................ | 261/122 |
| 3,269,664 | 8/1966 | Lamb et al.................... | 261/121 |

*Primary Examiner*—Tim R. Miles
*Attorney*—Kimmel, Crowell & Weaver

ABSTRACT: An aeration system wherein a plastic pipe is provided with porous ceramic inserts to release a controlled volume of gas from the pipe. The pipe also has a series of porous ceramic dewatering discs for drainage of liquid from the pipe; and A method of installing porous ceramic elements in a pipe wherein slots are formed in the pipe and dimensioned to tightly grip the elements. The slots are coated with a liquid cement to provide lubrication for insertion of the discs, and additional mastic is thereafter injected under pressure to form an adhesive bond between the elements and the pipe.

PATENTED DEC 7 1971 3,626,500

INVENTOR
CARL DUMMANN

BY
Kimmel, Crowell & Weaver
ATTORNEYS

AERATION SYSTEM AND METHOD OF FABRICATION

BACKGROUND OF THE INVENTION

1. Field of the Invention

This invention relates to an aeration system of the type used in aeration of sewage lagoons, or the like, and to new and novel means for fabrication of the system components.

2. Statement of the Prior Art

It has heretofore been known to release controlled quantities of gases from conduits in which the gas, at greater than ambient pressures, is contained, by means of porous ceramic elements which permit the emission of the gas therethrough. Such prior arrangements have however, employed complex special mounting assemblies for connecting the outlet elements on the pipe.

SUMMARY OF THE INVENTION

The present invention encompasses a system of aeration wherein a plurality of elongated pipes, preferably formed of polyvinyl chloride or the like, have a series of porous ceramic diffusing elements permanently mounted therein. In a preferred environment of employment, the pipes are mounted in a selected orientation on pylons in a body of liquid to be treated, such as a sewage lagoon. The pipes are preferably further provided with a series of dewatering discs which function to permit expulsion of any liquid which enters the pipes, but which prevent liquid intake therethrough.

An important feature of this invention centers about the capability of the components to be fabricated from readily available materials. To this end, a method of construction of the components comprises the formation of a series of slots in rows along two diametrically opposite lines on a section of polyvinyl chloride pipe. The slots in the pipe are formed using a cutter of circular construction, and thus have curvilinear forward and rear walls. A first row of slots, later to be oriented as an upper row, has slots substantially exceeding in number the slots of the opposite, bottom row. A group of porous ceramic discs of predetermined porosity, such as those known commercially under the CARBORUNDUM or ALUNDUM trade designations, are scored and then broken along a major diameter thereof. The prepared upper row of slots is then sprayed with a polyvinyl chloride cement, or the like, and the segments of the broken discs are tapped into place with a mallet or other tool with the semicircular side disposed in the pipe passageway and the broken diametric side exposed. The cement serves, while moist, as a lubricant, and subsequently hardens to a mastic. The pipe is then inverted, and unbroken discs are similarly installed in the lower row of slots. Thereafter, all of the discs are permanently sealed to the pipe by the application of polyvinyl chloride cement through a pressurized needle, similar to a hypodermic syringe, which forces the cement into the space between the pipe and the disc. This pressurized application of the cement forces a quantity thereof into adjacent pores of the disc, effecting a complete chemical weld between the stone and the pipe.

The invention provides a means by which relatively small air compressors are adapted for employment in the aeration of large sewage lagoons, or other bodies of water of substantial size, to produce a substantially completely homogenously aerated area. The introduction of the air in small bubbles speeds the distribution and absorption process.

Other and further objects and advantages of the invention will become apparent to those skilled in the art from a consideration of the following specification when read in conjunction with the annexed drawing.

DESCRIPTION OF THE PREFERRED EMBODIMENT

Figure 1:
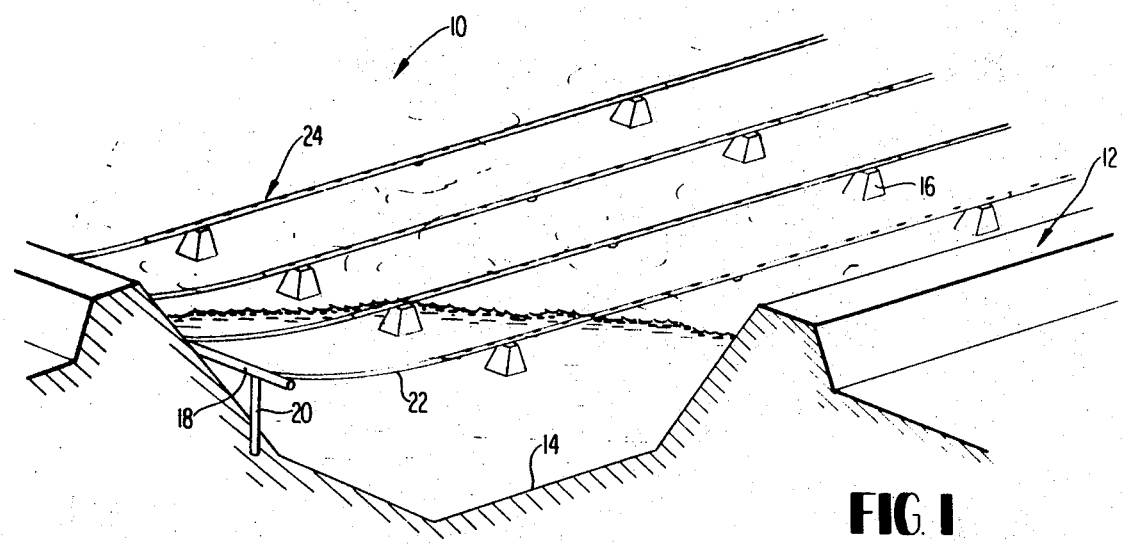
FIG. 1 is a perspective view, partially in cross section, of a typical installation embodying an aeration system constructed and assembled in accordance with the teachings of this invention.
Figure 2:
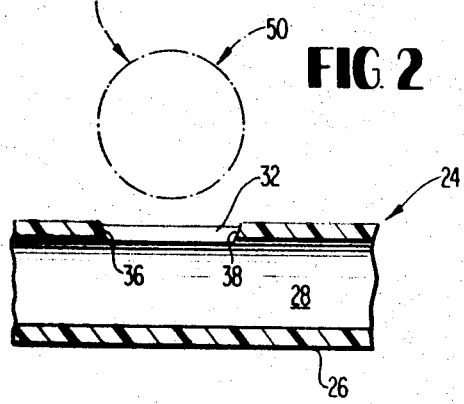
FIG. 2 is an enlarged longitudinal cross section through a portion of pipe section showing a first step in a fabrication procedure.
Figure 3:
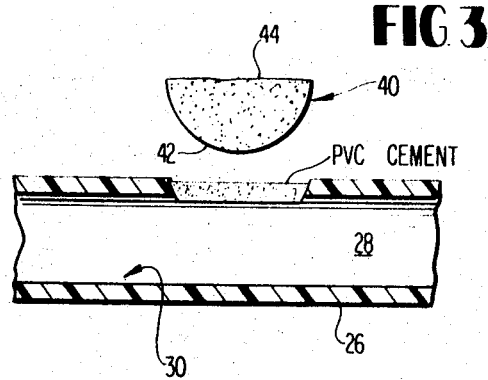
FIG. 3 is a view similar to FIG. 2 showing a next step in the procedure.
Figure 4:
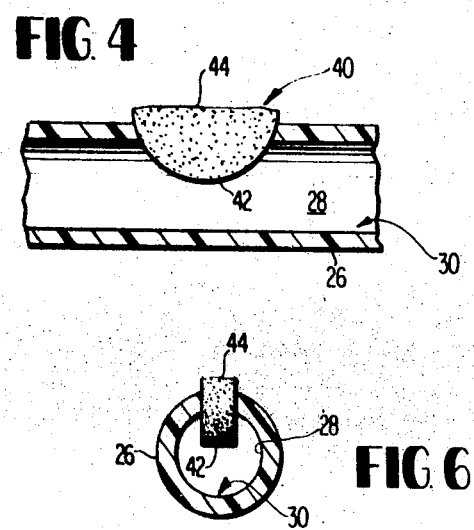
FIG. 4 shows the completed installation of one of the diffuser elements of the invention.
Figure 5:
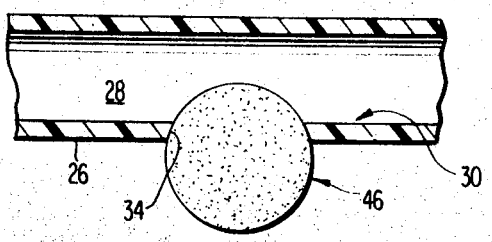
FIG. 5 shows the completed installation of a dewatering disc of the invention.
Figure 6:
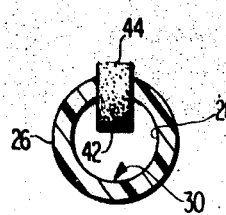
FIG. 6 is a transverse view through the pipe showing one of the diffuser elements in place.

Referring to the drawing in more detail, in FIG. 1 an overall system in accordance with the present invention is shown in use in the aeration of a sewage lagoon or the like 10, having a surrounding wall structure 12 and a floor 14 which is normally sealed by some means appropriate to sail and weather conditions. Situated on the floor 14 are rows of pylons 16 formed of concrete or other durable material. An elongated air supply header 18 extends along one wall of the lagoon, and is supplied with air at greater than ambient pressure by a pipe 20. The pipe 20 is connected to a remote compressor (not shown). The header is supplied, at intervals corresponding generally with the rows of pylons, with a plurality of flexible connectors 22, each of tubular construction. Each connector is fixed to a string of pipes 24, described in detail below.

Each string of pipes 24 is composed of a plurality of elongated, tubular pipe sections formed of polyvinyl chloride or similar, relatively rigid plastic material. The pipe sections each have an outer surface 26 and an inner wall surface 28, and the inner wall defines an elongated passageway 30 extending throughout the full length of each section—the terminal section of each string having an appropriate plug in the passageway at its distal end. The pipes 24 form a more or less rigid network which can be easily mounted on the pylons 16, whereby the pipes are not likely to be covered by sludge and will not be carried away from the area of original placement.

The pipe sections each have two rows of longitudinally aligned slots formed therein at diametrically opposite locations, including an upper row of slots 32, and a row of slots 34, the lower row 34 comprising in some instances, only a single slot. The slots are formed to include curvilinear forward and rear walls 36, 38, and the slots extend fully through the pipe wall, opening on the passageway 30. It is a feature of this invention that the upper slots 32 substantially exceed in number the lower slots 34, for a purpose appearing below.

Adhesively bonded to each of the upper slots 32 is a diffuser 40 of this invention. The diffusers 40 comprise porous ceramic elements such as used commonly for filters or filter stones, illustratively those sold under the trade designations ALUNDUM or CARBORUNDUM. Other types of ceramic or stone elements, having known porosity characteristics, may be substituted if desired. Each diffuser 40 has a semicircular side 42, and an irregular diametric side 44. The diffusers are secured in the upper slots 32, the sides 44 being exposed, and the sides 42 engaging against the slot walls 36 and 38 conformably, a major segment of each diffuser being disposed within the passageway 30.

Secured in the slots 34 in like manner are dewatering discs 46. Each of the discs 46 is of flat, circular form.

In a typical installation, wherein a pipe section of ten foot length is employed, approximately ten diffusers are installed, as compared to one dewatering disc. This ratio is stated by way of example only, variations being possible where conditions dictate.

The irregular surfaces of the diametric sides 44 of the diffusers presents a roughened surface to the water to be treated. This surface aids in preventing the growth of algae or the deposit of mineral encrustations which might otherwise tend in time to clog the pores of the stone. Moreover, the exposure of maximum stone area provides many alternate pore routes for air passage in the event that some pores do become clogged, leading in turn to prolonged system life.

In the normal operation of the system, air under pressure is introduced from the header and through the flexible connectors to each string of pipe sections. The air is diffused through the diffusers 40 in minute bubbles and thus aerates the surrounding liquid. In the event that water enters the system, as by loss of pressure, the water tends, upon restoration of pressure, to gravitate to the bottom of the pipe. The air pressure in the pipe then forces the water outwardly through the dewatering stones or discs 46.

The invention provides further a new and novel method of manufacture of the pipe sections. The pipe per se is commercially available and, in practice of the method hereof, is initially slotted at 32 and 34 in the proportion indicated above by use of a circular cutting tool, such as a Woodruff key cutter, indicated in an outline at 50 in the drawing. The cutting tool 50 is of a size approximating that of the discs 46. A group of stone discs are then scored diametrically by any suitable scoring procedure, and broken along the score line. The slots 32 are then sprayed with polyvinyl chloride cement, as from an aerosol container, and the cut discs, now in the form of diffusers 40 are inserted and tapped into place with a mallet. The pipe is then rotated to expose the lower slots 34, the slots sprayed with cement, and the unbroken discs 46 inserted and tapped to a location whereat they contact the slot walls. Finally, the stones are permanently sealed in place by the application of additional polyvinyl chloride cement through a pressurized needle inserted between the diffuser and discs and employed to force the cement into said place, the pressure forcing a small quantity of the cement into adjacent pores in the stone and creating a chemical weld between the stone and the pipe.

I claim:

1. An aeration pipe comprising:
    elongated pipe means including a pipe section having a tubular pipe wall defining a passageway;
    the pipe having a first series of slots and a second series of slots;
    the first series of slots having a plurality of porous diffusers secured therein; and
    the second series of slots having porous dewatering discs therein.
2. The invention of claim 1, wherein:
    the diffusers include an irregular exposed portion.
3. The invention of claim 1, wherein:
    the first and second series of slots are diametrically opposite to one another in location.
4. The invention of claim 3, wherein:
    each diffuser is of semicircular form and includes a semicircular side extending into the passageway; and
    each dewatering disc includes a portion extended into the passageway.
5. Apparatus in a system for aeration of a sewage lagoon, the lagoon being filled with a liquid to be aerated, the apparatus comprising:
    an elongated header with a plurality of outlet openings formed therein;
    means supplying air under pressure to the openings of the header;
    a flexible connector of tubular construction secured to the header about each of said outlet openings;
    a series of elongated tubular pipes formed of polyvinyl chloride secured to each of the flexible connectors to receive air therefrom, the pipes having passageways extending the full length thereof;
    the lagoon having a series of pylons therein to support the pipes;
    each pipe having an upper side and a lower side, and having a series of slots formed therein;
    the slots being arranged in an upper row of longitudinally aligned slots and a lower row of longitudinally aligned slots, the upper row substantially exceeding in number of slots the lower row;
    a semicircular diffuser element engaged in each slot of the upper row, each diffuser having an irregular diametric side exposed exteriorly of the pipe, and a semicircular side having a major portion located within the passageway;
    a circular dewatering disc engaged in each slot of the lower row, each disc having a portion located in said passageway; and
    the diffuser elements and dewatering discs being formed of porous ceramic material and being adhesively bonded to the pipe.
6. A method of manufacture of an aeration pipe comprising the steps of:
    forming a longitudinally aligned row of slots in a tubular pipe section;
    forming at least one dewatering slot in the pipe section at a location diametrically opposed to the longitudinally aligned row of slots;
    coating the slots with a liquid cement;
    inserting a semicircular diffuser in the slots of the longitudinally aligned row; and
    inserting a dewatering disc into the dewatering slot.
7. The invention of claim 6, and:
    injecting a liquid cement under pressure between the diffuser and the slot.
8. The invention of claim 7, wherein:
    the diffusers are porous ceramic material; and
    the injected cement is polyvinyl chloride and enters the pores of the diffusers.

* * * * *